June 11, 1929.  W. BANKS ET AL  1,716,679

CONTROL GEAR FOR WASHING MACHINES

Filed July 31, 1926  4 Sheets-Sheet 1

INVENTORS
W Banks
W Brooke
by Dowdam O'Brien
Atty.

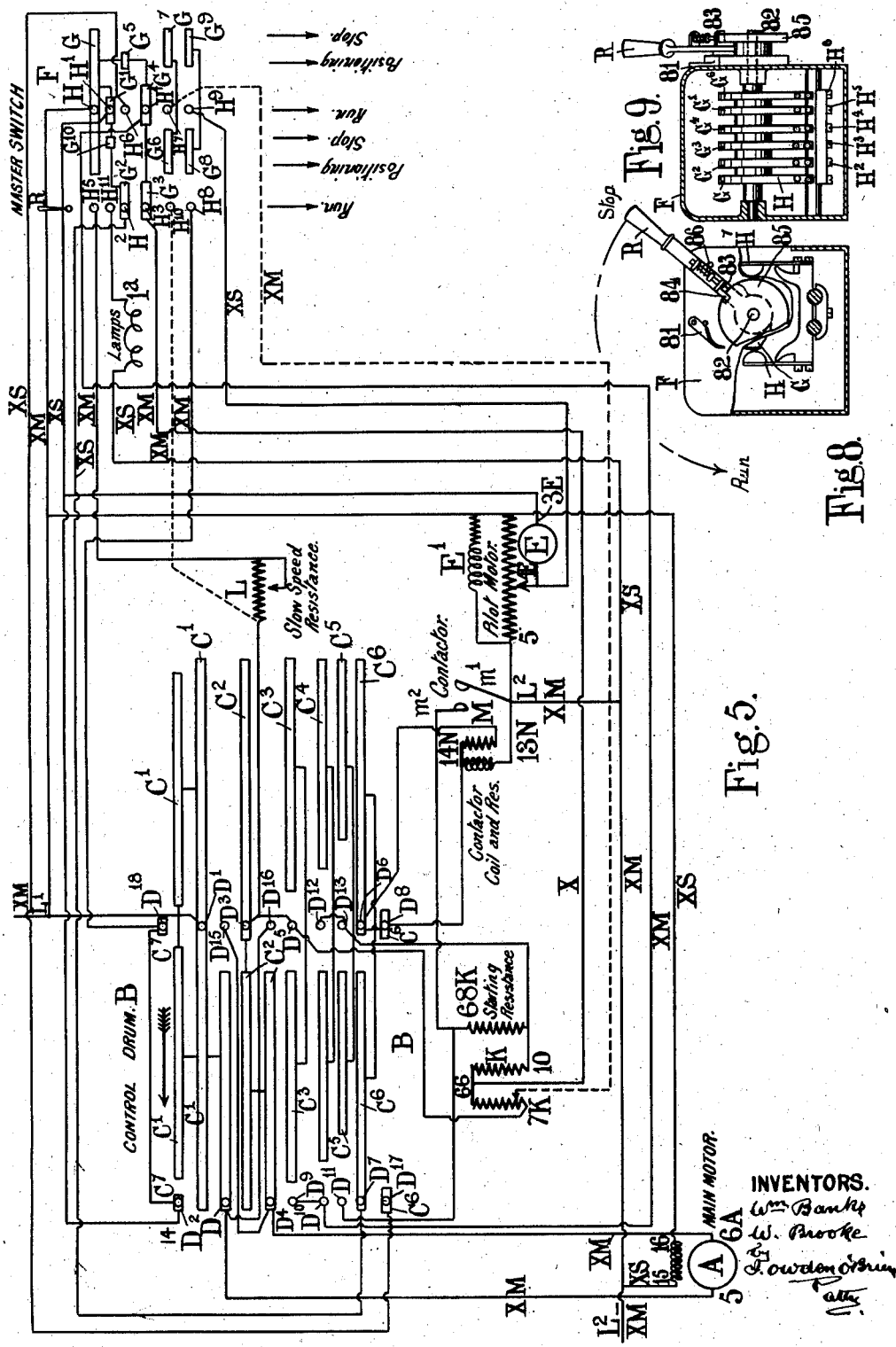
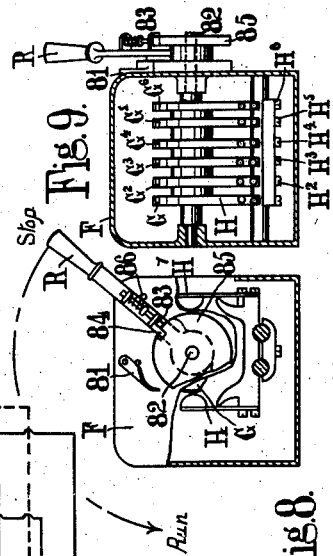
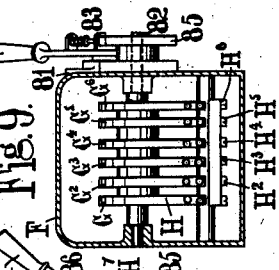

Patented June 11, 1929.

1,716,679

UNITED STATES PATENT OFFICE.

WILLIAM BANKS, OF KENDAL, AND WILFRID BROOKE, OF ALTRINCHAM, ENGLAND, ASSIGNORS TO ISAAC BRAITHWAITE & SON, ENGINEERS LTD., OF KENDAL, ENGLAND.

CONTROL GEAR FOR WASHING MACHINES.

Application filed July 31, 1926, Serial No. 126,245, and in Great Britain August 20, 1925.

This invention relates to control gear for reversing electric motors applied to the driving of machines with frequently reversing rotary or reciprocating parts more particularly to machines such as washing machines in which a rotary member is operated in one direction for a predetermined number of rotations and automatically reversed and similarly rotated in the reverse direction.

The invention comprises in combination with the motor and the machine a rotary control drum or discs continuously rotated in one direction by a pilot motor, a starting resistance in connection therewith, a master contactor on which the whole of the breaking of the current will take place, a master controller by which the starting, stopping and "inching" or positioning of the rotor of the machine will be effected and mechanism by which the machine will be finally stopped with the rotary or reciprocating member in a predetermined or desired position.

The invention will be fully described with reference to the accompanying drawings.

Figure 1:
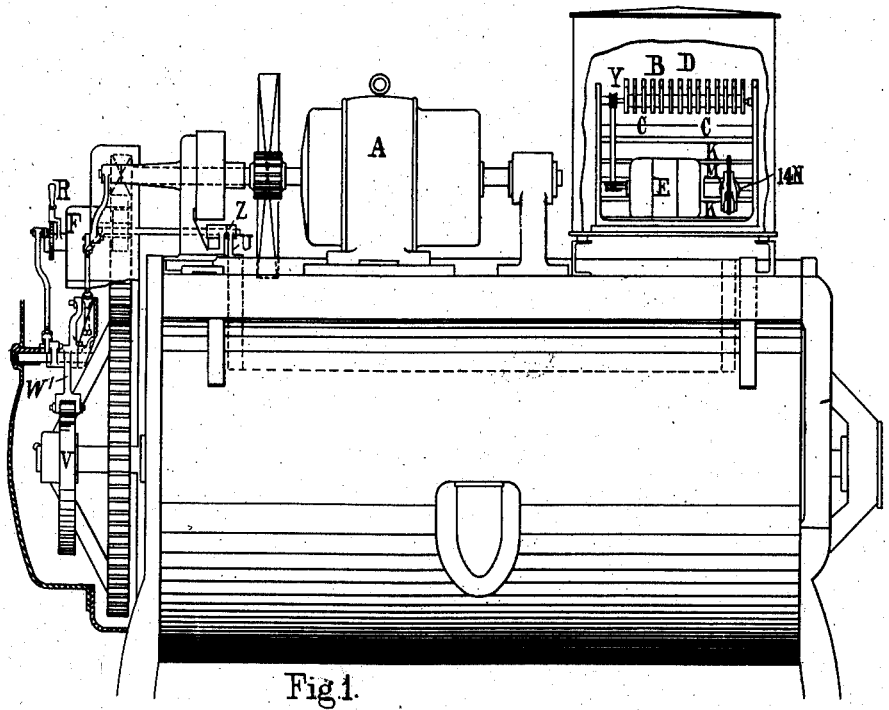

Fig. 1. Elevation from back of rotary washing machine with the invention applied thereto.

Figure 2:
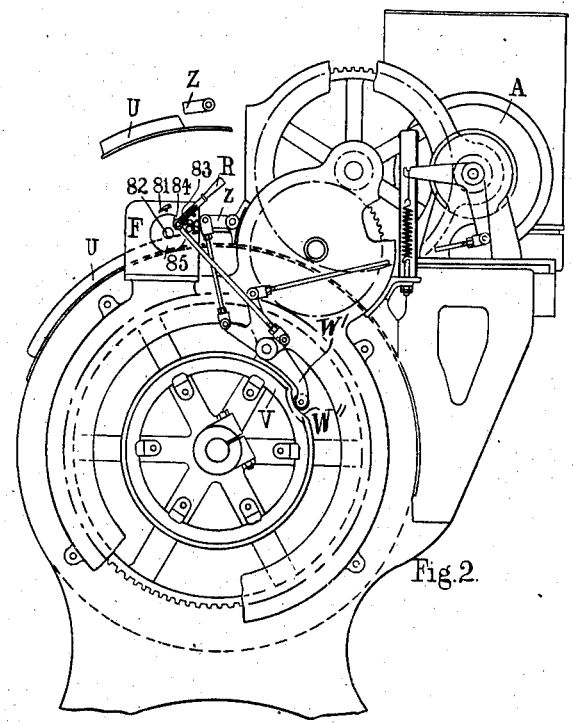

Fig. 2. End elevation showing the main or master controller F, the "inching" or positioning mechanism for the rotor, and stop to prevent the door of the casing being opened.

Figure 3:
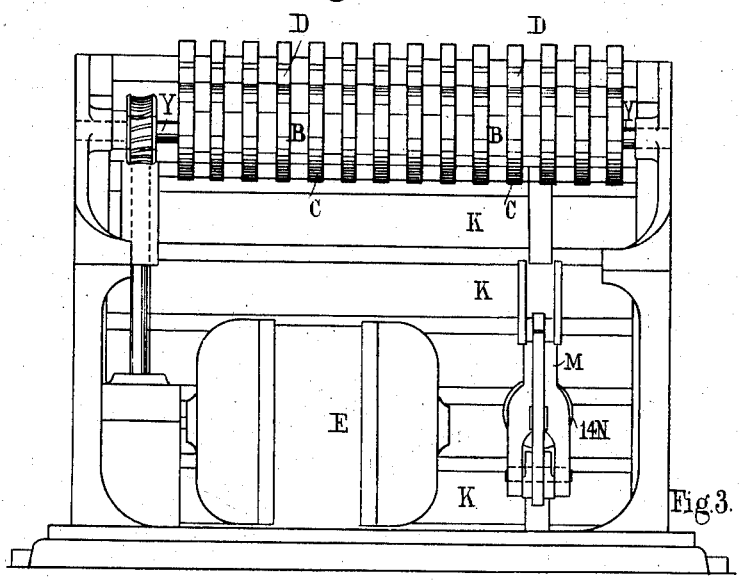

Fig. 3. Front elevation of the rotary controller or control drum B and pilot motor.

Figure 4:
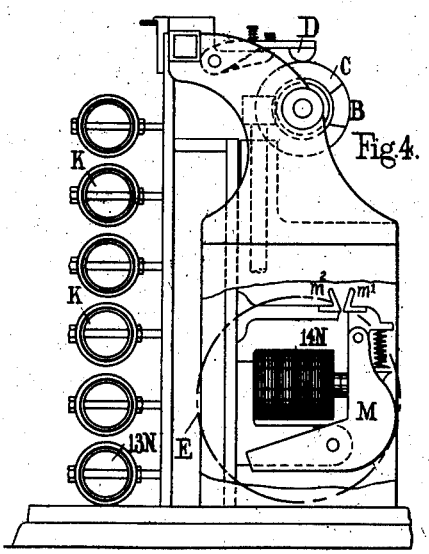

Fig. 4. End elevation of same.

Fig. 5. Wiring diagram and contacts for automatic control and inching.

Figure 6:
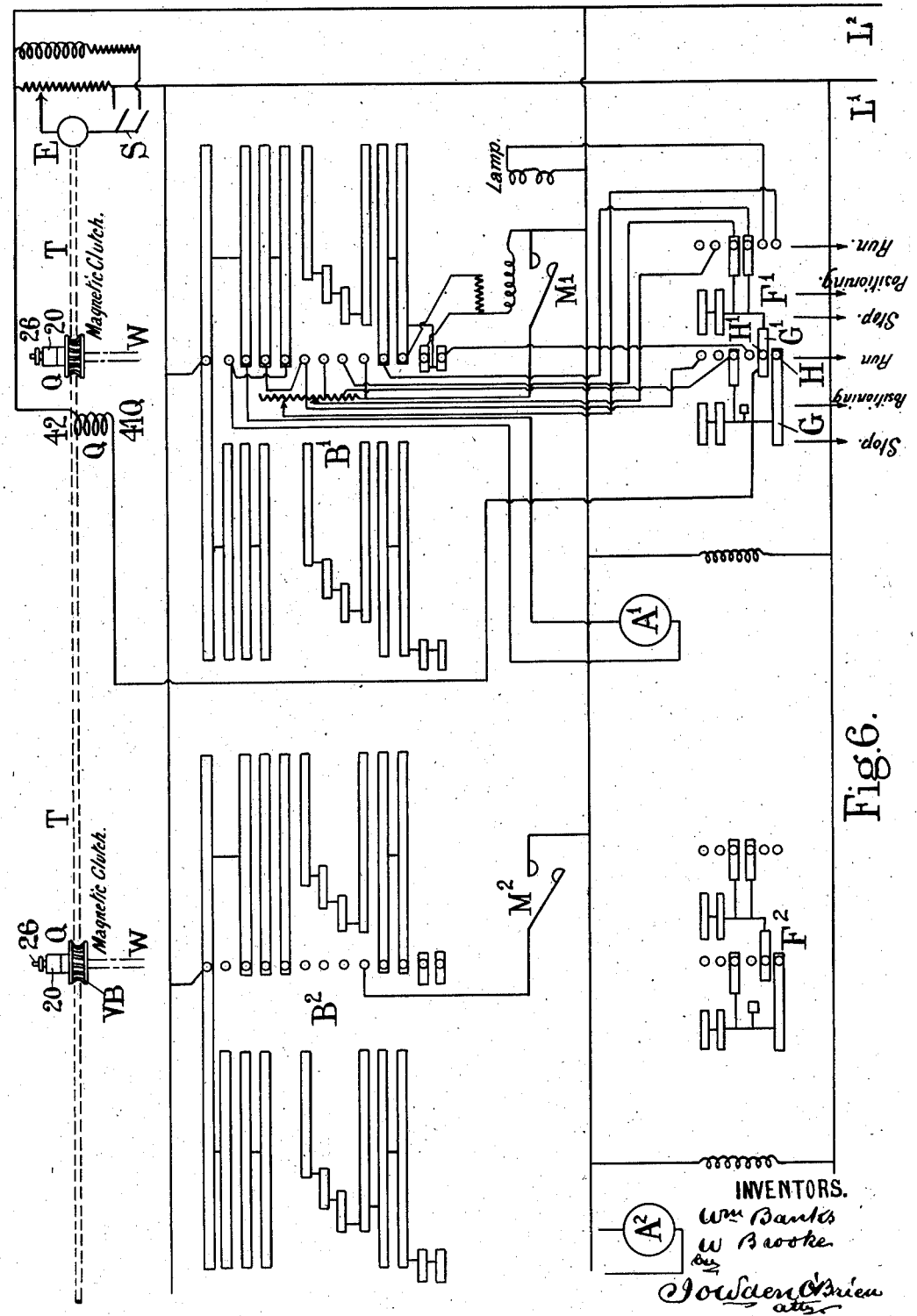

Fig. 6. Wiring diagram and contacts for driving a number of machines from a single continuously rotary pilot motor E through shaft T.

Figure 7:
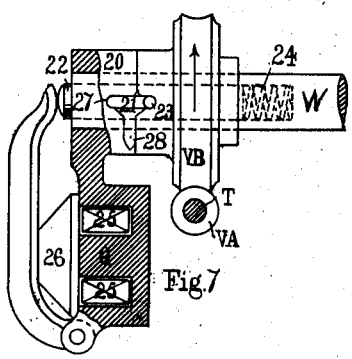

Fig. 7. Detail view of the electro-magnetically operated clutch for use on shaft T.

Fig. 8. Front elevation of the master controller F partly in section.

Fig. 9. Transverse section of same.

The washing machine is of ordinary construction with outer stationary casing and rotary reciprocating cage and electric motor A preferably mounted thereon with gearing to rotate the cage.

The electric control apparatus or drum B by which the main motor A is reversed or driven in one direction for a number of revolutions and then in the reverse direction for a similar number of revolutions comprises a plurality of disc contacts C, mounted on a spindle Y and rotated continuously in one direction, while the machine is running, by a small pilot motor E and a corresponding number of stationary contacts D which successively make contact as the device rotates directing the current through the main motor A first in one direction and then in the reverse direction, the disc contacts C on the drum controller being arranged to establish or initiate the reversing connections and also to cut out the starting resistance K in a suitable number of stages or steps.

The contacts comprise a number of copper segments which establish a sliding contact with a corresponding number of contact fingers D.

The starting resistance K may be of any known form and is brought into the circuit by the rotary control drum B as the current to the motor A is reversed.

The master contactor or "clapper switch" M is electrically operated and is controlled by the rotation of the control drum B the current being cut off from it and allowing it to open prior to the reversing of the current to the main motor A.

It comprises a hinged member $m^1$ which establishes contact with a stationary member $m^2$ under the influence of a closing coil $14^N$ and a retaining resistance.

The master controller F comprises a rotary spindle or drum with a number of contact segments G co-acting with contact fingers H and may be rotated by a handle R to take up one of two positions "run," and "positioning" or "stop" to establish connections for the starting operations and for the positioning and stopping operations respectively by which the machine is brought to rest with the rotary or reciprocating member always in the same desired position.

The operating handle R is mounted loosely on the spindle 82 and fitted with a sliding catch 83 to engage a notch 84 in a disc 85 fast on the spindle. A latch 81 is pivoted in a suitable position as shown, for the purpose of disengaging the lever R from the disc 85 when the operation is in the contrary direction to the arrow shown in Fig. 8 which indicates the direction for stopping. This engagement is effected by a projection on catch 83 riding over latch 81 and effecting disengagement with the disc 85. When lever R is moved in the opposite direction it will re-engage with the disc 84 by reason of catch 83 dropping into notch 84, and when moved to its extreme position in that direction it will not disengage disc 85 as the projection on catch 83 would pass under the latch 81 which, being hinged, will lift up instead of allowing the projecting catch to ride over it as described in reference to the stopping direction.

The disc 85 is connected by a rod or link to a lever $W^1$ Fig. 2 which may take up either of three positions in respect to the notched cam wheel V which is attached to the rotor or reciprocating member of the machine. When the handle R is in its first position, namely, the starting position, it takes up a position on the extreme left in reference to Fig. 2, in which position the lever $W^1$ is lifted clear of the cam wheel V. When the handle is moved to the second position, namely, "positioning or stopping", it is on the extreme right as drawn in Fig. 2, but in this position is disengaged from the disc 85 in the manner already described, and whilst in this position the lever $W^1$ will take up either of two positions, depending on the position of the notch $W''$ in cam wheel V in its point of revolution. The lever $W^1$ which is preferably provided with a roller, may thus rest upon the rim of the cam wheel V, which operation provides the necessary connections in the master controller F for the purpose of positioning or initiating the slow speed movement which ultimately brings the machine to rest at a predetermined point of its revolution. The remaining position taken up by lever $W^1$ is thus shown in Fig. 2 when the depression in the wheel V enables lever $W^1$ to take up this further position. This is referred to as the "off" position in which position the master controller switches off all the circuits previously made. It will thus be understood that whilst the spindle or drum attached to disc 85 can take up either of three positions, the operating handle only takes up two positions as described, the starting position being initiated by the operator whilst the final stopping position is initiated by the machine in the manner described. Attached to the lever $W^1$ is also a rod for allowing a brake to be operated on the motor A by means of the spring shown, when the pre-determined stopping position as shown in Fig. 2 only has been reached. In all other positions of lever $W^1$ the brake is released.

A safety catch Z is fitted to or connected with the lever $W^1$ which engages with a raised portion or rib on the door U of the machine and prevents the opening of the door before the current is cut off and the motor stationary and locked in position and also prevents the switching on of the current and starting of the motor, while the door of the machine is open. By this construction a single control lever R may control all the operations of the machine.

In operation when the lever R of the master controller F is brought into position for starting and running of the machine the main contacts G, $G^1$, $G^2$ come into contact with their respective contact fingers H, $H^1$, $H^2$ thereby starting the pilot motor E and controller drum B in the direction of the arrow Fig. 5, bringing the several contacts $C^1$, $C^2$ et cetera thereon successively into contact with their contact fingers $D^1$, $D^2$ et cetera passing the current through the starting resistance K and starting the motor A and the moving part of the machine. The current passes from the source of supply $L^1$ and contact finger H through contact G on master controller F, contact $G^1$, finger $H^1$, connection $3^E$, $4^E$, through motor regulating resistance to connection 5 and source of supply $L^2$. The shunt field of pilot motor E being permanently energized from $L^1$ through a field resistance through field $E^1$ to $L^2$ thus the pilot motor commences to rotate and revolves the control drum B in the direction of the arrow, so that its contact fingers $C^1$, $C^2$ et cetera co-operate in connection with their respective contact fingers $D^1$, $D^2$ et cetera.

On the first movement of the control drum B, contacts $C^1$ make contact with fingers $D^1$, $D^2$ and contacts $C^2$ establish contact with fingers $D^3$, $D^4$, and the path of the main current supply to the motor A is then source of supply $L^1$, finger $D^1$, contacts $C^1$, finger $D^2$, 5, main motor armature $6^A$, finger $D^4$, contacts $C^2$, finger $D^3$, fingers $D^5$, starting resistances $7^K$, $68^K$, to $m^2$ on master contactor M, $M^1$ and $L^2$, on the closure of contactor M. As previously mentioned the faster contactor is particularly arranged to close after an open before the drum contacts are made and broken thus entirely eliminating arcing on the drum contacts, this is a particular feature of our invention. A slight further movement of the control drum B in the direction of the arrow brings contacts $C^6$ in co-operation with contact fingers $D^6$, $D^7$, $D^8$ and $D^{17}$. This establishes a separate circuit from supply $L^1$, contact finger H on master controller F, through contact G, $G^2$, finger $H^2$, contact finger $D^7$, on control drum B, contact $C^6$, contact finger $D^8$ to contactor coil $14^N$ to $13^N$ and source of supply $L^2$, thus closing the contacts of the master contactor M and completing the main motor circuit as described through its full starting resistance. The shunt field winding of the motor shewn at 15 and 16 is here connected permanently across the source of supply $L^1$ and $L^2$, but it may equally well be arranged with contact 15 connected to $m^2$ of the master contactor M, in order that it may be disconnected when the master contactor M is open, or the motor may be provided with a series or compound winding.

A further movement of the control drum B brings $C^3$ into contact with $D^5$ and $D^9$, thus short circuiting a portion of the starting resistance $7^K$, $D^9$ and speeding up the main motor. The short circuiting of this portion of the starting resistance is completed by two contacts in master switch F marked $G^3$ and $G^4$, which cooperate with contacts $H^3$ and $H^4$ only in the running position. This arrangement has for its object the provision of more latitude for any slight overrun or inconsistency in the stopping position of the pilot motor where it becomes switched off for inching or positioning in the manner previously described. If during such stopping the pilot motor overruns to a position which would normally short circuit this resistance division it is prevented from doing so when the master controller F is in its inching or positioning position, and instead of this overrun resulting in the alteration of the resistance values and in consequence the speeds of the positioning operation, it does not produce such undesirable effect. This further movement of the control drum B causes the short contacts $C^6$ to become out of contact with fingers $D^8$ and $D^{17}$ in all but the predetermined stopping or positioning position of the control drum B. The opening of $C^6$, $D^8$ cuts off the normal feed circuit of contactor operating coil $13^N$, which has an alternative feed circuit through retaining resistance $14^N$, contacts $D^6$, $C^6$, $D^7$, $H^2$, $G^2$ in master controller and contact G finger H and supply $L^1$. This causes the contactor to be weakly energized sufficiently so to retain it in the closed position.

In case the master controller is switched off and then switched on simultaneously, the contactor coil circuit will become opened and afterwards reclosed. As the contactor itself will have become opened, it will be unable to reclose on the establishment of the weak excitation provided by the retaining circuit until the control drum turns round to the predetermined position, in which position only is the retaining circuit short circuited and full excitation of the contactor established through the master controller. Further movement of the control drum B brings contact $C^4$ to finger $D^{12}$ and $D^{10}$, thus short circuiting a further portion of the starting resistance 10 and 66 of the starting resistance K and in like manner contacts $C^5$ co-operate with fingers $D^{13}$ and $D^{11}$ and cuts out the remaining portion of the starting resistance 10, $D^{11}$ thereby bringing the main motor to its full speed. The main motor thus continues to run at its full speed for a certain predetermined period or cycle, as determined by the speed of the control drum B and the length of its contacts, after which the master contactor M becomes opened by its operating coil circuit being opened at contacts $D^6$ and $D^7$ from contacts $C^6$ thus cutting off the supply to the main motor A. The contacts on the drum forming the armature connections are broken slightly later than the opening of contactor M by the suitable timing of the contacts in order to ensure that no main current is broken on the drum contacts, as it is a particular feature of our invention that the contacts on the drum close earlier and open later than the master contactor M in order that all making and breaking is carried out by the latter as already described.

As drum B continues to revolve in the direction shown by the arrow in Fig. 5, the reverse cycle which causes motor A to start up in the reverse direction is as follows:—Contact $C^1$ slides under contact $D^{15}$, $D^{14}$ and $D^1$, $C^2$ makes contact with $D^3$, $D^4$ makes contact with $D^{16}$, $C^6$ makes contact with $D^6$ and $D^7$ and also with $D^8$ and $D^{17}$ it being understood that the control drum has been moved in the direction shown by the arrow through a further 180°. The main circuit becomes thus established as follows:—Source of supply $L^1$, finger $D^1$, contact $C^1$, $D^{15}$; $D^4$, main motor armature $6^A$, 5, $D^2$, $D^{16}$, contact $C^2$, finger $D^3$, $D^5$, starting resistance $7^K$, $68^K$ to $M^2$ on master contact M, $M^1$ and $L^2$ on the closure of contactor M, which is timed to close after the above described circuit has been otherwise established.

It will thus be observed that the direction of current through the main motor armature A has been reversed and it commenced to operate in the reverse direction.

The closing circuit of contactor M is similar to that described in connection with the forward direction, the circuit being as follows:—supply $L^1$, contact finger H on master controller F, through contact G, $G^2$, finger $H^2$, $D^7$ on control drum B, $C^6$, $D^8$, contactor coil $14^N$ to $13^N$ and source of supply $L^2$, thus closing the contacts of the master contactor M otherwise as described. The further movement of control drum B brings $C^3$ into contact with $D^5$ and $D^9$, thus short circuiting a portion of the starting resistance $7^K$, $D^9$ and speeding up the main motor. The remaining sections of starting resistance are cut out precisely as described in connection with the forward direction, and the main motor continues to revolve for a similar period of time in the reverse direction. On the continued rotation of the drum, the circuit is again opened at the master contactor M and following the arrangement of the forward connections on the drum, the master contactor again closes and thus the main motor carries out its cycle of starting up and running first in one direction and then in the other direction for equal periods of time, the master controller remaining in the starting position during the whole of this operation. The rest of the running operation is carried out precisely as previously described.

Presuming that the control equipment has been in operation as described and it is desired to stop the machine, the handle R of the master controller F is moved away from the running position towards the stopping position as far as the handle will go during which movement the handle R becomes disengaged from its spindle 82 by means of the latch 81 as previously described. The pilot motor armature circuit becomes interrupted between contact $G^1$ and finger $H^1$ in the master controller, and the master contactor M becomes opened by reason of its attracting coil circuit being interrupted by contact $G^2$ and finger $H^2$ in the master controller F. The circuit of the main motor is thus opened and the main supply to the pilot motor is interrupted as described. The pilot motor armature has, however, an alternative supply through finger $D^{14}$ contact $C^1$, finger $D^1$ and source of supply $L^1$, which causes the pilot motor to continue to operate until the control drum B is brought to a certain predetermined position. This predetermined position is preferably that in which the whole of the starting resistance is in circuit and the armature circuit of the main motor also established and finally completed on the closure of contactor M. The wiring diagram Fig. 5 shows the contacts of the control drum B in this predetermined stopping position.

The pilot motor E is prevented from overrunning this predetermined position after its supply circuit has become interrupted by preventing the drum contacts $C^3$ cutting out a section of the starting resistance if it should come in co-operation with contact finger $D^9$ on the control drum B due to this circuit being interrupted in the master switch in any but the running position as has already been described.

As a further means of guarding against any tendency of the pilot motor E to overrun this predetermined position, it would be noted that two contacts $C^7$, connected together, have been provided on the control drum B co-operating with contact fingers $D^{14}$, and $D^{18}$ for the purpose of short circuiting the armature of the pilot motor E if any tendency to overrun the predetermined stopping position takes place, this provides a dynamic brake for the pilot motor E as will be understood by those skilled in the art. During this operation the master controller drum fingers will occupy either the positioning or "stop" positions depending at what point of its movement the revolving portion of the washing machine stops with reference to the notch $w^1$ in the cam wheel V Figs. 1 and 2 in respect to the operating mechanism of the master controller. Assuming it takes up the positioning position, the slow speed diverter resistance L becomes connected in parallel with the armature of the main motor A by means of connection from the resistance mentioned to finger $H^5$ on master controller, contact G, contact finger H and source of supply $L^1$ in the manner otherwise as already described. Immediately upon the control drum B arriving at the pre-determined position as shown by its contacts in Fig. 5 the master contactor M becomes automatically closed by means of its operating coil by the circuit as follows:—source of supply $L^1$, finger H in master controller F, contact G, $G^5$, finger $H^6$ to drum controller finger $D^{17}$, contact $C^6$, finger $D^8$, contactor operating coil $14^N$, $13^N$ to source of supply $L^2$.

The circuit of the slow speed diverter resistance L having already been established by the master controller F in the manner described, the main motor is thus permitted to revolve at a slow speed and becomes automatically stopped when the rotary member of the washing machine arrives at a certain pre-determined position, as indicated by the notch $W''$ in the cam wheel V on Fig. 2, at which point the master controller becomes automatically switched off in the manner already described. On the completion of this operation of positioning, the final movement of the master controller spindle brings contact $G^{10}$ into co-operation with finger $H^{11}$ on master controller which completes the circuit to an indicating lamp, $1^a$, or other device, which indicates that the machine is stopped in a safe position and that the doors or other means of access in the machine may be opened.

Other contacts and fingers are shown in the master controller at $G^6$, $G^7$ and fingers $H^7$, $H^{10}$ and contacts $G^8$, $G^9$ and fingers $H^8$, $H^9$. These contacts co-operate respectively with their corresponding fingers only in the inching or stopping position. The former are provided for the purpose of adjusting the values of the slow speed diverter resistance when required to meet heavy torque conditions without interfering with the values of the main starting resistance, in order that the slow speed or positioning conditions may be made without compromising the starting conditions. Contacts $G^8$, $G^9$ and fingers $H^8$, $H^9$ in the master switch are also only established in the inching or stopping positions and are intended for the purpose of ensuring that the dynamic braking circuit of the pilot motor is only operative under stopping conditions and thus prevent any possibility of short circuiting the pilot motor armature under any running conditions. These operations will be understood by those skilled in the art. XM are the external main connections and XS the external shunt connections.

It may be desirable to control a group of machines from one controlling equipment where the motors operating such machines function quite separately, but are under one single control equipment. It is intended that these machines may be started or stopped quite independently of one another, exactly as would be the case if they were operated from individual controlling equipments of the type already described. Fig. 6 shows a wiring diagram of such an arrangement for the controlling of two machines.

This equipment comprises a pilot motor E which is started up by means of a double pole switch S and rotates continuously along shaft T. Drum controllers B¹, B² are located with their operating spindles perpendicular to the shaft T from which they are driven by a suitable gearing of the bevel, worm or other type VA, VB. These control drums B¹, B² along with their contactors M¹, M², are similar in general details and principle to the single equipments already described, and need no special description here as far as the general principle being described is concerned. The main washing machine motors A¹, A² are understood to be separate machines, entirely unconnected, and are each intended to be controlled by their respective master controllers F¹, F² in a manner which will be readily understood.

The carrying out of our invention in respect to this application varies from the one described for the single equipments only in that means are provided for mechanically clutching or de-clutching the individual control drums B¹, B² to or from the common revolving spindle T as desired, which operation is initiated from the respective master controllers, whereas in the single equipments the stopping and starting of the control drum B is effected by the stopping and starting of the pilot motor. As, however, in the multiple controlled equipment now being described, it will be understood that the starting and stopping of the pilot motor has given place to the contriving of separate clutching mechanisms in order to allow the controlling of the other machines to be continued whilst any particular one is being stopped and the operations of positioning carried out. Electro-magnetically operated clutches are provided which are incorporated with the gearing at VA, VB, such as shown at more detail in Fig. 7 and which are disconnected by the master controllers F¹, F², et cetera.

The magnetic clutch shown in Fig. 7 is intended for use with shaft T of Fig. 6, when a number of machines are connected with a single continuously rotating pilot motor E and shaft T. It comprises a worm VA, worm wheel VB loose on the shaft W of the control drum B¹ journalled in a bracket 20. A sliding stud 22 is fitted into a recess in the end of the shaft W forced outwards by a spring 24, a pin 23 is fitted therein projecting through a slot 21 in the shaft W to engage a notch in the boss of the worm wheel VB or a corresponding notch 27 in the bearing bracket 20. The bracket also forms an electro-magnet Q with coils 25 and armature 26 the armature being extended to engage the end of the sliding stud 22. In the position shown the shaft W rotates with the worm wheel. On demagnetizing the magnet the sliding stud 22 will be forced back by the spring and the pin 23 through the slot 21, to engage the notch 27 in the bracket 20.

It will be understood, however, from the drawing that this complete disengagement can only become accomplished when the notch in the boss of the worm wheel, (in which position it is shown) comes opposite the notch 27 in the bearing bracket 20, so that whilst the magnet 25 may be de-energized at any particular point of rotation of drum controller shaft W, the disengagement between the worm wheel VB and the shaft W can only take place at a definite point as determined by the axial position of the notch 27 in the bearing bracket 20. When this dis-engagement takes place the driving member or pin 23 takes up its position on the extreme left of slot 21 and engages in the notch 27 in the bearing bracket 20. The controller drum B is thus securely held in this position by slot 27 and driving member or pin 23 in stud 22. This pre-determined stopping position is the one shown by the position of the contacts of the drum controller in Fig. 6 which corresponds to the position shown in Fig. 5, which is the position preparatory for the carrying out of the positioning operation of the rotor cage of the machine.

In this position all the starting resistance is inserted in the motor circuit and the main motor armature connections are established. A recess 28 is provided between the bearing bracket 20 and the boss of the worm wheel VB, which will admit driving member 23 in order that when the shaft W is being clutched into engagement with worm wheel VB there shall be no possibility of the driving member 23 becoming jammed between the stationary bearing bracket 20 and the revolving worm wheel VB. The direction of rotation of the worm wheel is indicated by the arrow in Fig. 7. When shaft W is being reclutched into motion with the worm wheel VB, the magnet 25 is re-energized and the armature 26 becomes attracted, pushing the sliding stud 22 against the influence of spring 24 and the driving member or pin 23 becomes moved across the slot 21 from left to right and can only complete its travel across the slot 21 when the notch in the worm wheel comes opposite notch 27 in the bearing bracket 20.

Referring to Fig. 6 the scheme of connections has been completed to one of the controllers only. It is understood for the purposes of our illustration that the other control drum contacts D, D² et cetera with their main motors and master controllers F are similarly connected. Assuming that the control drum B¹ is stationary by reason of its having become declutched from the spindle T (which we assume to be revolving continuously) operated by the pilot motor E with the switch S in the closed position, and also the motor A¹ is operating a washing machine or other similar machine, operated by the master controller F¹, which is intended to be mounted on the machine, the handle R of the master controller would be moved to the starting position in which the contacts are there shown. In this position current will enter the master controller from source of supply L¹ through finger H, contact G, contact G¹, finger H¹ to clutch magnet operating coil 41$^Q$, connection 42 to source of supply L². The clutch magnet winding is also shown at Fig. 7 reference 25. On this clutch magnet becoming energized, the armature 26 becomes attracted and the clutch mechanism is brought into engagement with worm wheel VB, also Fig. 7 in the manner described, which causes the master control drum B¹ to revolve. This proceeds to carry out the starting and reversing operations of the main motor A¹, contactor M¹ being utilized for breaking the main current exactly in the same manner as previously described.

Whilst the master controller is in the running position as shown in Fig. 6 the motor A¹ will continue to carry out this cycle of operations of starting and running alternatively in one direction and the other until the master controller is switched off, precisely as described in the foregoing. This operation immediately opens the main contactor M¹ in the manner described which at the same time opens the clutch magnet winding Q at contact finger H¹ on the master controller F¹, and releases the armature 26. This initiates the declutching operation, which disconnects the control drum B¹ from revolving shaft T, but this disconnection does not become effective until the control drum arrives at a certain pre-determined position, preferably with its contacts as already shown in the diagram. This corresponds to the slot in the worm wheel boss in Fig. 7 becoming opposite the slot 27 in the fixed bearing bracket 20 which enables the spring 24 to push the engaging member 23 fixed to sliding stud 22 out of engagement with the worm wheel VB. The shaft W thereupon ceases to revolve and is held in the desired position by the engaging member 23 entering the slot 27 on the fixed bearing bracket 20. When the operation is complete, the slow speed connections comprising the inching or positioning circuit become established precisely as before described and the moving element of the washing machine is slowly revolved until it reaches a certain predetermined position where access can be gained to the doors and the internal element as hereinbefore described.

On arriving at this position, the master controller F¹, becomes moved to its final position, which opens the contactor M¹, cutting off current to motor A¹ and lighting safety signal lamps 1$^b$ as previously described, this final motion of the master controller being carried out by means of the lever gear shown in Fig. 2 when the roller or lever W¹ drops into notch $w^1$ on the cam wheel V, which is integral with the revolving element of the machine, thus applying the brake to the spindle of the driving motor, and also releasing the mechanical interlocks to enable the sliding doors U to be opened by sliding upwards, also substantially as described.

Whilst the foregoing description relates to our invention as applied to continuous current motors it may equally well be applied to motors or alternating current circuits as will be well understood by those skilled in the art.

The invention though primarily designed for washing machines may be applied to other machines with reversing parts either rotary or reciprocating such as shirt, collar and cuff ironing machines with a reciprocating table, drying and other tumbler machines, rotary dyeing washing and scouring machines, reciprocating machine tools, mixing machines and the like.

What we claim as our invention and desire to protect by Letters Patent is:—

1. In a motor controller adapted to carry out periodic reversals in the direction of rotation of a washing machine the combination with a continuously rotating motor of means operated by the motor for periodically reversing the machine and a controller capable of slowing down or stopping the machine in a predetermined position when the machine is travelling in either direction, a manually operated handle on the controller capable of occupying one of two extreme positions by which starting and stopping is initiated and means associated with the controller for automatically starting, slowing down and finally stopping the machine in the predetermined position after initiation by the controller.

2. Control gear for reversing electric washing machine motors after a predetermined number of revolutions in either direction and subsequently stopping them in a given position, comprising a rotary disc control drum, a pilot motor to continuously rotate the control drum in one direction, an electrically operated switch in the circuit and a coil for operating the switch whereby the whole of the breaking of the current will be effected by the switch, a master controller only operated during starting and final stopping of the machine, a spindle therein, contact segments on the spindle, a disc carried by the spindle and engaged by the handle when moving in one direction but disengaged therefrom when moving in the reverse direction, a cam switch operated by the handle through the disc when the handle is moving in the first mentioned direction and a mechanical brake applied by the cam switch to bring the machine automatically to rest with the rotary cage in a definite predetermined position.

3. Control gear for reversing electric washing machine motors after a predetermined number of revolutions in either direction and subsequently stopping them in a given position comprising a rotary disc control drum, a pilot motor to continuously rotate the control drum in one direction, an electrically operated switch in the circuit and a coil for operating the switch whereby the whole of the breaking of the current will be effected by the switch, a master controller only operated during starting and final stopping of the machine, a spindle, therein, contact segments on the spindle stationary contact fingers engaged by the contact segments on rotation of the spindle, a handle capable of occupying one of two positions loose on the spindle, a disc carried by the spindle and engaged by the handle when moving in one direction but disengaged therefrom when moving in the reverse direction, a notched cam on the shaft of the rotary member of the machine, a lever linked with the disc, a further lever controlled by the disc to engage the notch in the cam to initiate the slow speed movement which finally brings the machine to rest, and a mechanical brake applied by the disc to bring the cage to rest in a definite predetermined position.

4. In a washing machine the combination with the control gear claimed in claim 1 of a safety catch to prevent the opening of the lid while the machine is running, and to prevent the starting of the machine while the lid is open.

In testimony whereof we have hereunto set our hands this 20th day of July, 1926.

W. BANKS.
W. BROOKE.